Aug. 24, 1943.   W. R. MATHENY   2,327,541
GASKET CONSTRUCTION AND METHOD OF MOUNTING SAME
Filed Aug. 15, 1941
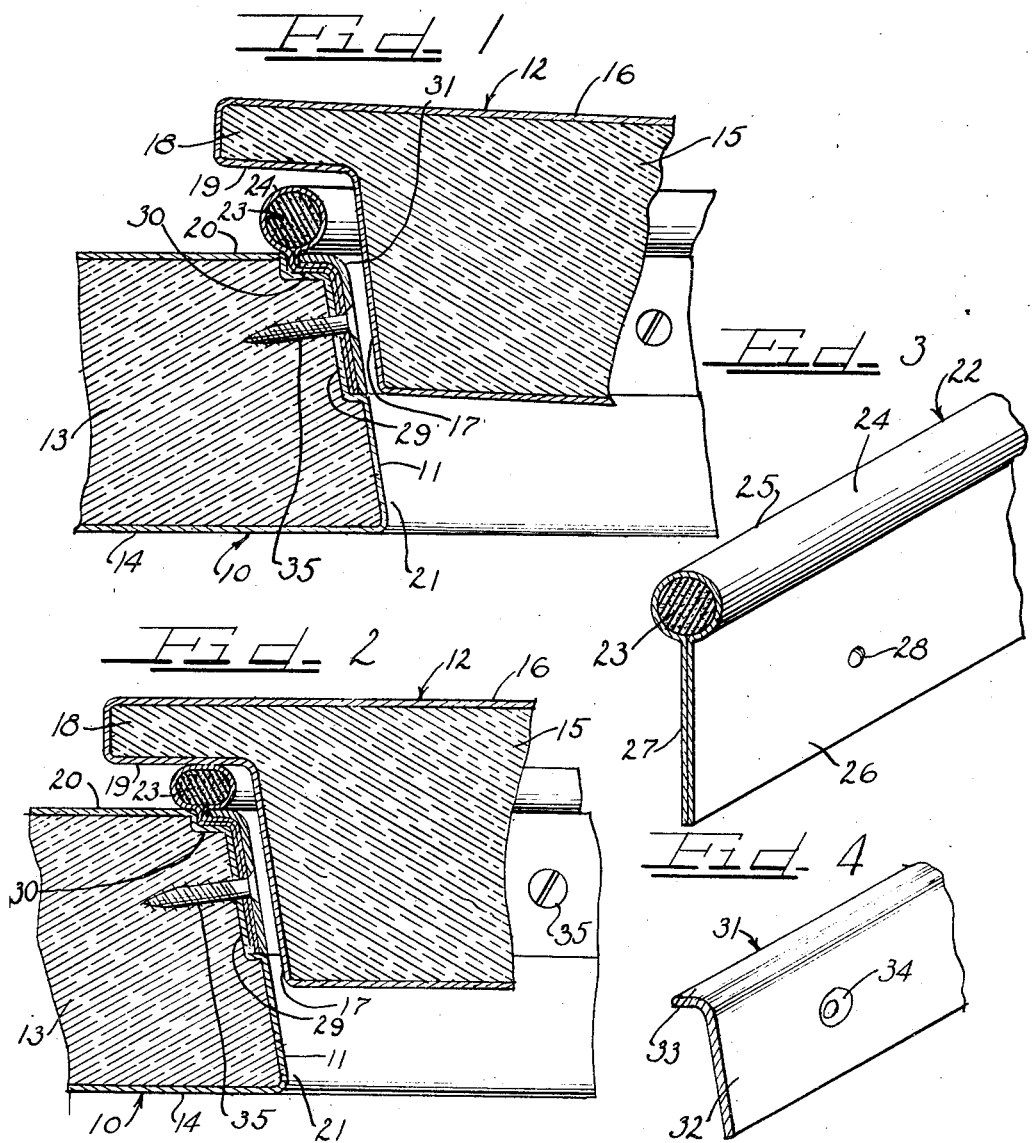
INVENTOR
WILLARD R. MATHENY Patented Aug. 24, 1943

2,327,541

UNITED STATES PATENT OFFICE 2,327,541

GASKET CONSTRUCTION AND METHOD OF MOUNTING SAME

Willard R. Matheny, Chicago, Ill., assignor to Nellie F. Harnly, Chicago, Ill.

Application August 15, 1941, Serial No. 406,968

4 Claims. (Cl. 20—69)

The present invention relates in general to a gasket construction and is more particularly concerned with a resilient compressible gasket construction for sealing closure members and to a method of mounting the same.

In the usual gasket constructions, including weatherstrips, using such materials as rubber, felt, fabrics and the like, difficulty has been experienced in providing a construction which is adapted to be satisfactorily mounted on a support. These constructions are usually either of the compression or friction type with the former being preferable as the friction type wears quickly by abrasion.

The usual gasket construction is provided with a reinforced mounting flange sometimes having a bent retaining strip thereon in order that constant flexing in operation will not result in early failure. This construction is objectionable as being expensive, unsightly and often interferes with the proper operation of the members which it seals.

The present invention seeks to provide a gasket construction in which these objectionable features are eliminated. Generally, it is contemplated to utilize an elongated rubber strip housed by an intermediate portion of a fabric member whose marginal edges are brought together in face engagement. The marginal edges are then disposed in recesses provided in corner portions of adjacent surfaces on a closure member and clamped thereon by a backing plate connected to the closure member by screws or the like. The depth of the recesses is such that the backing plate is disposed flush with the unrecessed portions of the surfaces of the closure member. In this manner, the free fabric-housed rubber strip may be positioned either along an edge or an intermediate portion of a surface of the closure member and is compressed by another closure member to seal the space therebetween.

Such a construction is particularly advantageous for installation in connection with windows or doors of refrigerators, refrigerator cars, automobiles, railroad cars, airplanes and the like which require sealing. In such installations, the openings to be sealed may be of various configurations and the abutting surfaces of the closure members may not lie in a single plane. A gasket constructed in accordance with the principles of this invention may be readily conformed to any shape in three dimensions to effect ease in installation regardless of the shape of the abutting surfaces.

It is therefore an object of this invention to provide a gasket construction which is airtight, is adjustable automatically to variations in compressibility, is readily replaceable, and is inexpensive in construction.

Another object of this invention is to provide a compressible gasket construction which may be readily shaped to conform to three dimensional surfaces.

A further object of this invention is to provide an improved gasket construction having a flange for mounting on one surface of a closure member with a compressible head portion being mounted at an edge or along an intermediate portion of an adjacent surface of the closure member.

Another object of this invention is to provide an improved gasket construction having a resilient mounting flange and an enlarged compressible head sealing portion with means for mounting the flange on one closure member and the head portion being positioned for compression by a second closure member to seal the space between the closure members.

A still further object of this invention is to provide a gasket construction having a resilient mounting flange with an enlarged compressible head portion whereby, when a surface is pressed against the head portion, this portion will compress and flatten against the surface to form an excellent seal, yet will, upon removal of the surface, be returned to its normal enlarged condition by its own resiliency.

Another and still further object of this invention is to provide a gasket construction having a mounting flange arranged to be mounted flush with an adjacent surface and an enlarged compressible head portion for sealing a surface pressed thereagainst.

A still further object of this invention is to provide a backing plate construction for clamping a gasket construction to a closure member, the backing plate construction clamping a mounting flange on the gasket construction to the closure member whereby a compressible head on the gasket construction is positioned for sealing a surface pressed thereagainst.

Another object of this invention is to provide a novel method of connecting a gasket to a closure member on which it is mounted whereby the gasket member is more securely maintained in its operative relationship against becoming loosened or separated during abutment of the closure member with a cooperating surface to be sealed.

Still another object of this invention is the provision of a method of mounting a gasket member of the above character whereby a minimum of connecting screws or the like are necessary for providing an extremely secure attachment thereof to a closure member.

The novel features believed to be characteristic of the present invention are set forth with particularity in the appended claims. The invention itself, however, both as to its organization and manner of construction, together with further objects and advantages thereof may best be understood by reference to the following description taken in connection with the accompanying drawing in which:

Figure 1 is a fragmentary sectional view illustrating the application of a gasket construction, embodying features of this invention, between closure members to be sealed;

Figure 2 is a view similar to Figure 1 illustrating the sealing action of the gasket construction;

Figure 3 is a fragmentary isometric view of the compressible gasket construction illustrated in Figures 1 and 2; and, Figure 4 is a fragmentary isometric view of the backing plate construction which clamps the gasket construction to a closure member as shown in Figures 1 and 2.

Although the present invention may be utilized in various ways as a bumper and sealing medium for sealing the joints between confronting surfaces of relatively movable members, it is preferred that the gasket construction to be herein described be utilized in installations where the surfaces to be sealed are brought together in such directions that compressive forces will be applied to the gasket construction.

In Figure 1 there is illustrated a member 10 having an opening 11 therethrough which is to be sealed by a closure member 12. The member 10 may be the body portion of a refrigerator, automobile, airplane or the like and for convenience is shown as being formed with a wood base portion 13 and a metal covering 14. It is to be understood, of course, that the member 10 may be constructed of other materials or may be constructed of but a single material.

Likewise, the closure member 12 is illustrated as being formed with an insulating base 15 of wood or other suitable material covered by a metal covering 16.

The type of material and construction of the member 10 and closure member 12 will depend on the type of machine or article with which the gasket member of the present invention is associated.

The opening 11 is shown as being tapered to receive therein a similarly tapered portion 17 on the closure member 12. A sealing portion 18 is formed on the closure member 12 as an extension thereof and provides a sealing surface 19 on its inner side.

Likewise, the member 10 has a sealing surface 20 on the outside thereof adjacent the periphery of the opening 11. The closure member 12 is so supported that when it is moved into sealing position the sealing surface 19 overlaps the sealing surface 20 on the member 10.

As shown on Figures 1 and 2, the opening 11 in the member 10 is so shaped as to form a corner 21. This corner may be of angular or curved configuration such as will be experienced in window or doorway openings. From the following description of the gasket construction, it will be readily apparent that the gasket member is so formed that it may be applied to seal an opening of any configuration, whether it be angular or curved. Furthermore, the gasket construction may be easily bent to follow curves or offsets in the plane of the face of the sealing surface 20 on the member 10. Consequently, the sealing or gasket construction of the present invention may be readily conformed to three dimensional surfaces.

As best shown in Figure 3, the gasket construction 22 includes an elongated resilient strip 23 preferably of such material as sponge rubber or the like. This strip is illustrated as being circular in cross section although this shape may be varied as desired it being necessary only that the cross-sectional size of the strip be greater than the thickness of its mounting flange to be now described.

A flat flexible strip 24, of fabric or the like, has an intermediate portion 25 shaped to house the resilient strip 23. The marginal edges 26 and 27 of the flexible strip 24 are brought together in face engagement as illustrated to form a mounting flange extending radially from the resilient strip 23. A plurality of openings 28, only one of which is shown, are provided through the adjacent marginal portions in spaced relation along their length.

In Figures 1 and 2, the member 10 is illustrated as having a recess 29 formed in the opening 11 at its outer corner. The portion of the sealing surface 20 adjacent the same corner is recessed as at 30. The recesses 29 and 30 provide a stepped arrangement on adjacent surfaces of the member 10.

The mounting flange of the gasket construction 22 formed by the marginal portions 26 and 27 is disposed within the recesses 29 and 30. A clamping plate 31 (Figure 4) is L-shaped in cross section and has one leg 32 longer than its other leg 33. The length of the legs 32 and 33 are such that when the clamping plate 31 is applied against the mounting flange of the gasket construction as disposed in the recesses 29 and 30, the leg 32 will be coextensive with the mounting flange portion in the recess 29 with the leg 33 being enough shorter than the recess 30 to permit the flange portion adjacent the resilient strip 23 to extend through the slot defined by the edge of the leg 33 and the end of the recess 30.

Countersunk openings 34 are provided to the leg 32 of the backing plate 31 in such spaced relation as to register with the openings 28 in the mounting flange of the gasket construction 22. Screws 35, or other suitable connnecting members are then inserted through the registered openings 28 and 34 and through openings provided in the bottom wall of the recess 29 and into the base portion 13. This effects a clamping of the backing plate 31 of the mounting flange of the gasket construction in the recesses 29 and 30 and positions the housed resilient strip 23 in a position spaced from the upper corner of the opening 11 in the member 10. In this position, the housed resilient strip 23 is in alignment with the sealing surface 19 on the closure member 12.

It is to be noted in Figures 1 and 2 that the depth of the recesses 29 and 30 is substantially the same as the thickness of the mounting flange on the gasket construction 22 and the locking plate 31 whereby the outside surface of the locking plate lies flush with the surface defining opening 11 and the sealing surface 20. This provides for cleanliness and a pleasing appearance for the assembly. If desired, the locking plate 31 may be formed of brass or other similar material which is inert to any particular fluids which might flow through the opening 11 for the purpose of improving the pleasing appearance of the assembly.

Figure 1 illustrates the closure member 12 in a partially closed position relative to the member 10 in which the resilient strip 23 is in a free and uncompressed state. Figure 2 illustrates the closure member 12 in its closed position relative to the member 10 whereby the sealing surface 19 has engaged and compressed the housed resilient strip 23. This compression flattens the housed resilient strip and forms a flat surface in engagement with the sealing surface 19 to seal the space between the member 10 and the closure member 12.

It will be noted that the sealing surface 19 moves against the housed resilient strip 23 in a direction in line with the portion of the mounting flange immediately adjacent the resilient strip. Undue side flexing of the mounting flange is thereby eliminated and this together with the compression seal provides an assembly of long life.

It is to be understood that the mounting flange on the gasket construction of this invention may be connected directly to the outer surface of the member 10 with the housed resilient strip 23 being positioned at or adjacent the corner of the opening therein for coaction with the sealing surface on the closure member in exactly the same manner as described. In this form of mounting, the flange may be mounted directly on the surface adjacent the sealing surface 20 or mounted within a recess whereby the flange is flush with said adjacent surface. Likewise the mounting flange may be so connected to the surface defining the opening 11 that the sealing head 23 seals the space between the members 10 and 12 within the opening 11.

In addition, the gasket construction 22 may be mounted on the movable closure member 12 whereby it cooperates with the member 10 to seal a space therebetween as previously described.

From the foregoing description, it will be apparent that the present invention provides a novel gasket construction possessing the requisite amount of toughness, flexibility, and the capability of forming a long-lasting seal against dust, dirt, fluids and the like over long periods of use; and which is normally supported on its mounting member in a position for engagement with a closure member; and which utilizes an enlarged sealing head which will flatten out to produce a large area of contact with a surface when the surface is pressed against the head with sufficient force to cause its deformation and thereby seal the space between its mounting member and the contacting surface.

While a particular embodiment only of this invention has been illustrated, it will, of course, be understood that the invention should not be limited thereto, since many modifications may be made and, therefore, it is contemplated by the appended claims to cover all such modifications as fall within the true spirit and scope of the present invention.

I claim as my invention:

1. In a sealing assembly for a closure member having adjacent surfaces forming a corner and one of said surfaces constituting a sealing surface, a recess in the edge margins of said adjacent surfaces, said recess terminating in said sealing surface in an outwardly extending shoulder, a gasket member having a compressible sealing portion and a mounting flange extending therefrom, said sealing portion being disposed along said shoulder and outwardly thereof with the mounting flange extending along said shoulder, along the surface of that portion of the recess in the sealing surface and then around the corner and along the surface of the recess in the adjacent surface of the closure member, means securing said mounting portion against said shoulder and along said recess surfaces including a relatively rigid member having an angular cross section and disposed in said recess and around said corner against the mounting flange of the gasket with one edge thereof disposed against the portion of the mounting flange overlying said shoulder whereby movement of the rigid member inwardly of the recess causes a nipping action between said shoulder and said edge.

2. In a sealing assembly for a closure member having adjacent surfaces forming a corner and one of said surfaces constituting a sealing surface, a recess in said sealing surface, said recess being defined along one edge by an outwardly extending shoulder, a compressible gasket member having a sealing portion and a mounting flange extending therefrom inwardly along the surface of said shoulder and then substantially laterally along the surface of said recess with the sealing portion disposed outwardly of said shoulder, means retaining said mounting member including a rigid element overlying said mounting member in said recess and means compressing said rigid element laterally and edgewise against the area of said mounting member which overlies said shoulder to nip the same.

3. In a closure assembly, a sealing surface, a recess in said surface defined along one edge by an outwardly extending shoulder, a gasket assembly including a compressible sealing portion and a mounting flange, said sealing portion extending outwardly in the vicinity of the shoulder and said mounting flange extending over said shoulder and then along the face of said recess, means holding said flange in the recess including a rigid member disposed in said recess and over the flange therein with one edge substantially parallel with the shoulder and means securing said rigid member in said recess to urge said edge toward the shoulder to nip the flange portion therebetween.

4. In a sealing assembly for a closure member having a sealing surface, a shoulder disposed on said surface to extend outwardly therefrom, a gasket member having a compressible sealing portion and a mounting flange extending therefrom, said sealing portion extending from said sealing surface in the vicinity of the shoulder with the adjacent portion of the mounting flange extending inwardly along the surface of the shoulder and then laterally along the sealing surface, means securing the gasket member to said sealing surface including a relatively rigid member overlying said surface with the laterally disposed portion of the mounting flange sandwiched therebetween, and with an edge thereof disposed against the inwardly extending portion of the flange overlying the shoulder and means attaching said rigid member in position and compressing the edge thereof against the inwardly disposed portion of the flange to nip the same.

WILLARD R. MATHENY.